US006823085B1

(12) United States Patent
Arino (10) Patent No.: US 6,823,085 B1
(45) Date of Patent: Nov. 23, 2004

(54) IMAGE DATA COMPRESSION AND RECONSTRUCTION APPARATUS AND METHOD AND STORAGE MEDIUM THEREOF

(75) Inventor: Yasuhito Arino, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/534,543

(22) Filed: Mar. 27, 2000

(30) Foreign Application Priority Data

Mar. 25, 1999 (JP) .......................................... 11/081106

(51) Int. Cl.$^7$ ................................................ G06K 7/36
(52) U.S. Cl. .................................................... 382/232
(58) Field of Search ................................ 382/232, 233, 382/236, 238, 240, 242, 248, 250; 358/432, 433; 341/51, 63, 65, 67, 107; 364/724.04, 724.05, 724.11, 724.13, 724.14, 725.01, 725.02; 375/240.02, 240.03, 240.11–240.16, 240.18–240.2, 240.22–240.25

(56) References Cited

U.S. PATENT DOCUMENTS

| | | | | | |
|---|---|---|---|---|---|
| 4,055,756 A | * | 10/1977 | Jolivet et al. | ................ | 708/400 |
| 4,394,774 A | * | 7/1983 | Widergren et al. | .......... | 382/232 |
| 4,447,886 A | * | 5/1984 | Meeker | ........................ | 364/725 |
| 4,785,356 A | * | 11/1988 | Gonzales et al. | ............ | 382/238 |
| 4,833,722 A | * | 5/1989 | Morton et al. | ................ | 382/199 |
| 4,853,778 A | * | 8/1989 | Tanaka | ..................... | 348/422.1 |
| 4,862,261 A | * | 8/1989 | Tanaka | ..................... | 348/422.1 |
| 4,870,695 A | * | 9/1989 | Gonzales et al. | ............ | 382/238 |
| 4,885,786 A | * | 12/1989 | Anderson et al. | ........... | 382/235 |
| 4,890,161 A | * | 12/1989 | Kondo | ................... | 375/240.24 |
| 4,897,717 A | * | 1/1990 | Hamilton et al. | ....... | 375/240.07 |
| 4,910,608 A | * | 3/1990 | Whiteman et al. | .......... | 382/239 |
| 4,933,761 A | * | 6/1990 | Murakami et al. | ...... | 375/240.22 |
| 5,067,015 A | * | 11/1991 | Combridge et al. | .... | 375/240.11 |
| 5,109,451 A | * | 4/1992 | Aono et al. | ................... | 382/166 |
| 5,132,792 A | * | 7/1992 | Yonemitsu et al. | .... | 375/240.16 |
| 5,134,477 A | * | 7/1992 | Knauer et al. | .......... | 375/240.17 |
| 5,341,442 A | * | 8/1994 | Barrett | ................... | 375/240.24 |
| 5,768,427 A | * | 6/1998 | Pan et al. | .................... | 382/232 |
| 6,002,809 A | * | 12/1999 | Feig et al. | ................... | 382/298 |
| 6,137,904 A | * | 10/2000 | Lubin et al. | ................. | 382/162 |

FOREIGN PATENT DOCUMENTS

| | | |
|---|---|---|
| JP | 63-156476 A | 6/1988 |
| JP | 63-167569 A | 7/1988 |
| JP | 10-21386 A | 1/1998 |
| JP | 10-255033 A | 9/1998 |

OTHER PUBLICATIONS

FlashPix, "Live Picture Corporation Internet Site", Eastman Kodak Company.
JPEG, "Ohio State University, Computer and Information Science", Internet Site.

* cited by examiner

*Primary Examiner*—Jose L. Couso
(74) *Attorney, Agent, or Firm*—Sughrue Mion, PLLC (57) ABSTRACT

The purpose of the present invention is to make it possible to transmit image data at multi-levels without an increase in the total amount of data to be transmitted, and to designate the amount of data to be transmitted at each level. In order to do this, a process of compressing m pixels of first image data into n (n<m) pixels of second image data is comprised of (1) a step of multiplying neighboring pixels in the said first image data by respective given coefficients, which are set up so that the sum of the said given coefficients can be equal to a value resulting from the division of m by n, (2) a step of summing up the resultant values obtained by the multiplication, (3) a step of multiplying the resultant sum by a value resulting from the division of n by m. On the other hand, an image reconstruction apparatus reconstructs the first image data by calculating its pixel value from both a pixel value in the second image data and a reconstructed pixel value.

19 Claims, 10 Drawing Sheets

Fig.10

IMAGE DATA COMPRESSION AND RECONSTRUCTION APPARATUS AND METHOD AND STORAGE MEDIUM THEREOF

BACKGROUND OF THE INVENTION

1. Field of the Invention

The present invention relates to digital image data (hereafter, called simply "image data") compression and/or reconstruction method, apparatus and a storage medium thereof. The "image data compression" is defined as the process of decreasing the amount of image data, whereas the "image data reconstruction" is defined as the process of putting it back to the original amount of image data, which is the amount before the data was decreased.

2. Description of the Related Art

In recent years, the demand for transmitting and receiving image data via communication lines have increased as communication networks such as internets are developed and expanded. In systems for simply transmitting and receiving image data, there is a situation where: it is impossible to display image data on the receiver side until its reception has been completed; or even if the image data has been successfully displayed on the receiver side because it displays parts of the image data in the order of receiving them, it is difficult to determine whether or not the image data to be displayed on the receiver side is necessary.

Accordingly, in order to improve this situation, the following techniques for holding multiple resolutions of image information aligned in a hierarchical structure and transmitting the image information step by step: FlashPix (which is the trademark owned by Eastman Kodak Company) and Progressive JPEG have been proposed.

However, there are problems with those conventional techniques where the transmission of each stage of image data causes an increase in the total amount of transmission data and/or the desired amount of each stage of transmitting data cannot be designated.

SUMMARY OF THE INVENTION

The present invention has been developed taking the above problems into consideration. Its objective is to provide an apparatus and method for transmitting image data at multi-levels without an increase in the total amount of data to be transmitted, and a storage medium thereof.

Further, an objective of the present invention is to provide an apparatus, a method and its storage medium for designating the amount of data to be transmitted at each level.

According to an aspect of the present invention, an image compression apparatus that compresses m pixels of first image data into n (n<m) pixels of second image data is provided. This image compression apparatus is comprised of an image data compressor that: multiplies neighboring pixels in the said first image data by respective given coefficients, which are set up so that sum of the said given coefficients can be equal to a value resulting from division of m by n; sums up the resultant values obtained by the multiplication; and multiplies the resultant summed value by a value resulting from division of n by m, into the resulting value which functions as a value of a pixel in the said second image data.

According to another aspect of the present invention, an image reconstruction apparatus, which reconstructs first image data from the second image data including n (n<m) pixels that results from compressing the said first pixel data including m pixels, is provided. This image reconstruction apparatus is comprised of an image data reconstructor that calculates a pixel value in the said first image data from pixels in the said second image data and reconstruction pixel values that have been picked out from the said first image data.

According to still another aspect of the present invention, an image compression method, which compresses m pixels of first image data into n (n<m) pixels of second image data, is provided. This method is comprised of the process of multiplying of neighboring pixels in the said first image data by respective given coefficients, which are set up so that sum of the said given coefficients can be equal to a value resulting from division of m by n, summing up the resultant values obtained by the multiplication, and multiplying the resultant summed value by a value resulting from division of n by m, into the resulting value which functions as a value of a pixel in the said second image data.

According to still another aspect of the present invention, an image reconstruction method that reconstructs first image data from second image data including n (n<m) pixels, which results from compressing the said first image data including m pixels, is provided. This image reconstruction method is comprised of the process of calculating a pixel value in the said first image data from both a pixel value in the said second image data and a reconstruction pixel value picked out from the said first image data.

According to still another aspect of the present invention, a storage medium that is stored with a computer program for compressing m pixels of first image data into n (n<m) pixels of second image data is provided. The said computer program enables a computer to execute: a step of multiplying neighboring pixels in the said first image data by respective given coefficients, which are set up so that sum of the said given coefficients can be equal to a value resulting from division of m by n; a step of summing up the resultant values obtained by the multiplication; and a step of multiplying the resultant summed value by a value resulting from division of n by m, into the resulting value which functions as a value of a pixel in the said second image data.

According to still another aspect of the present invention, a storage medium that is stored with a computer program for reconstructing first image data from second image data including n (n<m) pixels, which results from compressing the said first image data including m pixels, is provided. The said computer program enables a computer to execute: a step of calculating a pixel value in the said first image data from both a pixel value in the said second image data and a reconstruction pixel value picked out from the said first image data.

BRIEF DESCRIPTION OF DRAWINGS

The above and other objects, features and advantages of the present invention will become more apparent from the following detailed description, when taken in conjunction with the accompanying drawings, wherein.

DETAILED DESCRIPTION OF THE PREFERRED EMBODIMENTS

A first embodiment of the present invention will be described with reference to the drawings.

Figure 1:
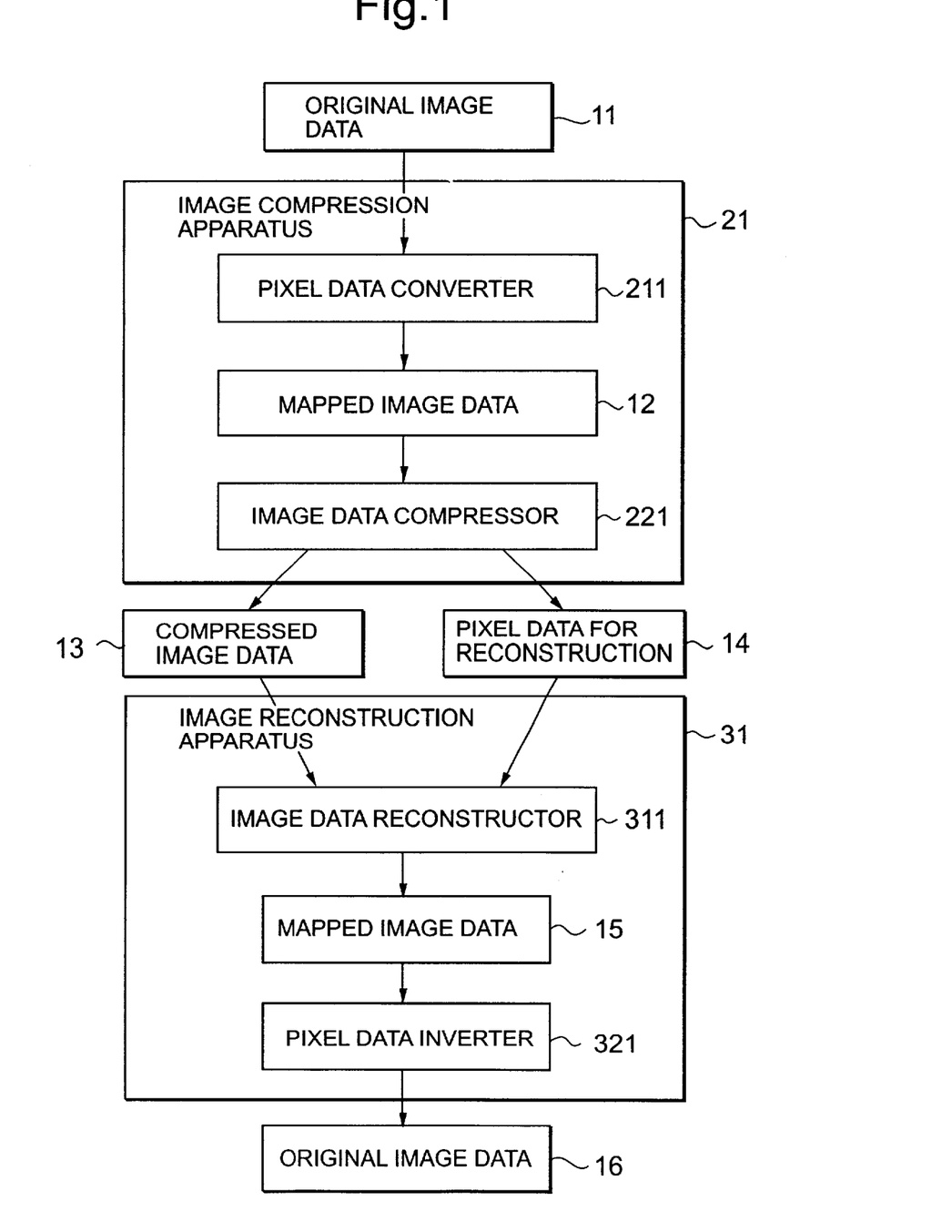
FIG. 1 is a block diagram showing the configuration of a first embodiment of the present invention.

In FIG. 1, the first embodiment of the present invention is comprised of image compression apparatus 21, which generates image data after compression 13 (hereafter, called "compressed image data") from the original image data 11 and also generates pixel data 14 that is be used to reconstruct the compressed image data 13 (hereafter, called pixel data for reconstruction), and image reconstruction apparatus 31, which generates reconstructed image data 16 by reconstructing it from both the compressed image data 13 (which has been compressed by the image compression apparatus 21) and the pixel data for reconstruction 14. In the embodiment, the image compression apparatus 21 and image reconstruction apparatus 31 are connected to each other via a communication line, etc. The compressed image data 13 and pixel data for reconstruction 14 are transmitted via the communication line.

The image compression apparatus 21 is made up of an image data converter 211, which generates image data 12 mapped (hereafter, called mapped image data) in such a matter that similar colors of pixels can have their similar representative values, and image data compressor 221, which generates compressed image data 13 and pixel data for reconstruction 14 from this mapped image data 12.

The image reconstruction apparatus 31 is made up of an image data reconstructor 311, which reconstructs the compressed image data from the pixel data for reconstruction 14 thus generating mapped image data 15, and a pixel data inverter 321, which reconstructs into reconstructed image data 16 from this mapped image data 15.

Next, the operation of the embodiment of the present invention will be described.

In FIG. 1, when the image compression apparatus 21 compresses the original image data 11, the image data converter 211 in the image compression apparatus 21 inputs the original image data 11. This original image data 11 is then converted thus generating the mapped image data 12 in such a manner that similar representative values of pixels can have similar colors.

Herein, an example of this type of process of conversion is one that converts image data with each pixel being represented by the values R(red), G(green), and B(blue) into image data with each pixel being represented by either one of the RGB values. That is, in the case where each pixel in the original image data 11 is represented by a mixed value of the RGB components, similar pixel values cannot result in giving similar colors. To solve this problem, image data of the R component, image data of the G component, and image data of the B component are generated, and are then subjected to a compression and restoration process. The following process is used in the process of conversion so that similar pixels values result in giving their similar colors: a process of converting into a representation represented by the power levels of respective frequency components of color; a process of converting into a representation represented by gray levels if it is a monochrome image.

Next, the image data compressor 221 in the image compression apparatus 21 divides the mapped image data 12 into the compressed image data 13 and pixel data for reconstruction 14, which are then transmitted to the image reconstruction apparatus 31 via a communication line, etc.

When the image reconstruction apparatus 31 restores the compressed image data 13, the image data reconstructor 311 in the image reconstruction apparatus 31 restores the compressed image data 13 with the assistance of the pixel data for reconstruction 14, thus generating a resulting reconstructed, mapped image data 15.

Afterwards, the pixel data inverter 321 in the image reconstruction apparatus 31 converts the reconstructed, mapped image data 15 into a reconstructed image data 16. Note that this process of conversion is completely opposite to that of the pixel data converter 211 in the image compression apparatus 31.

In this way, the process from the compressing of image data to the reconstructing of the image data is over.

Next, a compression algorithm used in the image data compressor 221 and a reconstruction algorithm used in the image data reconstructor 311 will be described in more detail.

Figure 2:
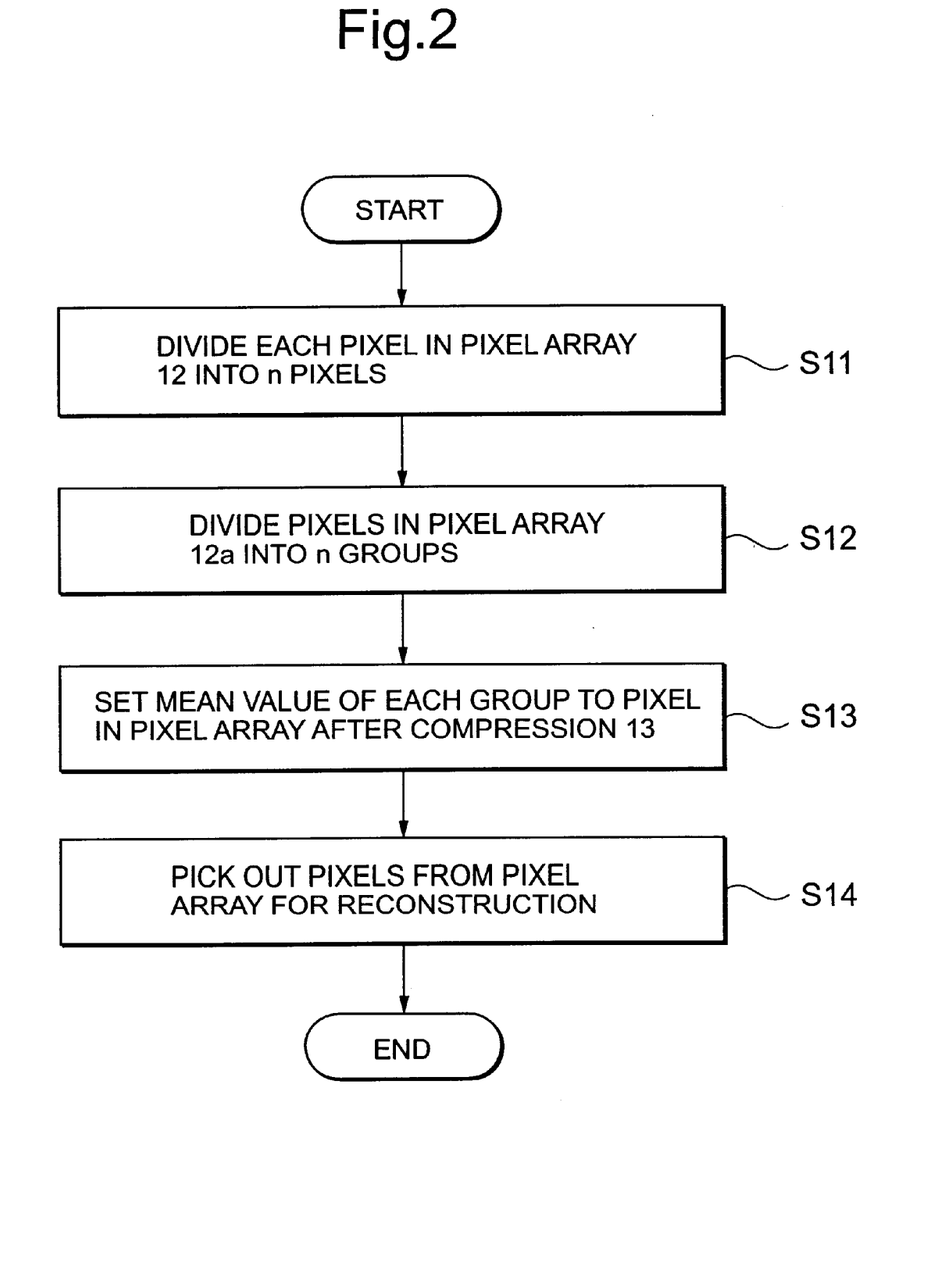
FIG. 2 is a flowchart showing an example of an image data compression algorithm, according to the first embodiment of the present invention.
Figure 3:
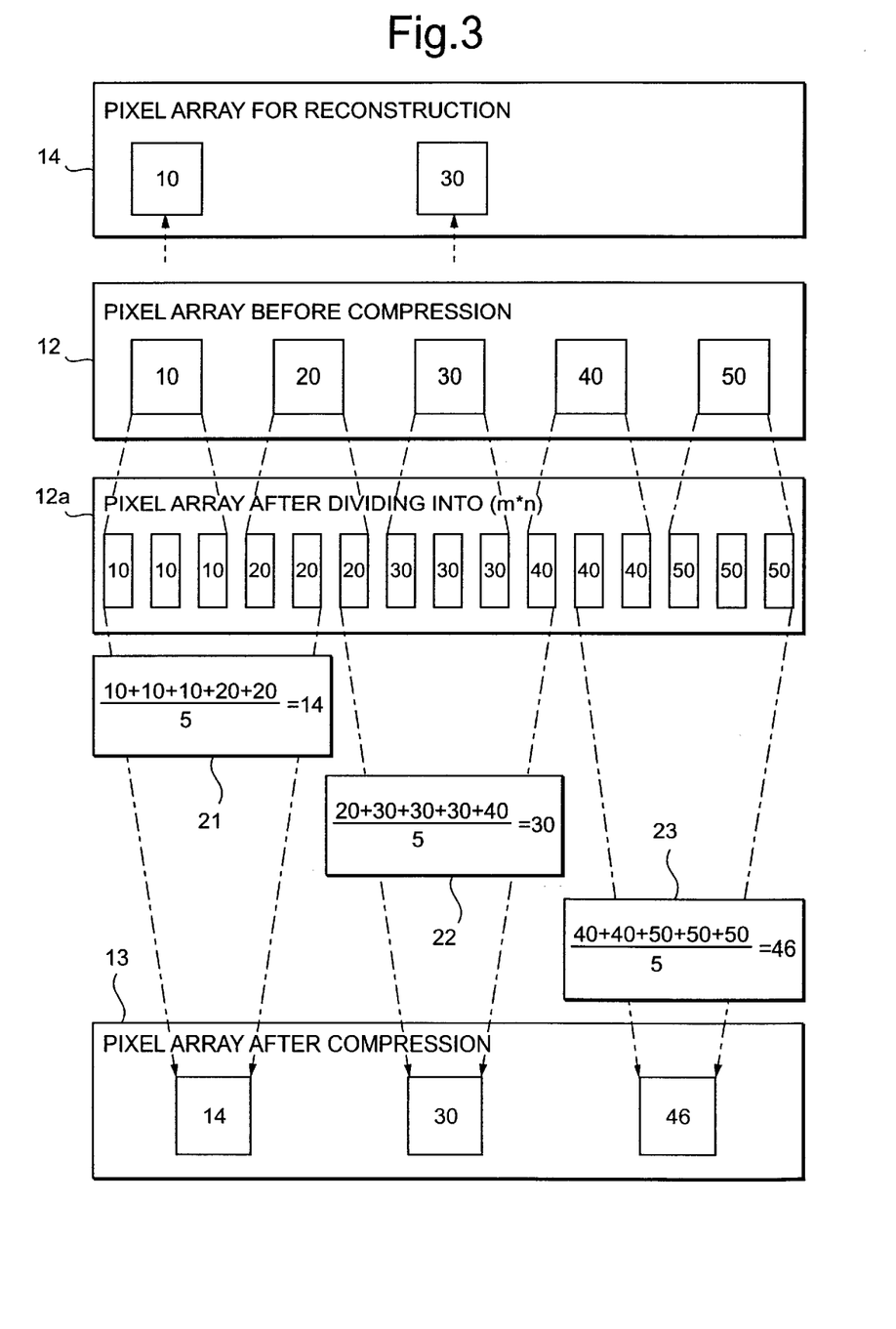
FIG. 3 is a figure explaining an image data compression algorithm, according to the first embodiment of the present invention.

FIG. 2 is a flowchart showing an embodiment of the compression algorithm the image data compressor 221 uses. This embodiment, in the case where a horizontal line of pixels structuring image data (hereafter, called "pixel array") is made up of m pixels, relates to a method of compressing the pixel array into a pixel array of n (n<m) pixels. The usage of this method for a vertically arranged pixel array allows a horizontal and vertical compression to be made at a desired compression ratio. FIG. 3 concretely explains the operation in a case where m=5 and n=3, according to this method.

In FIG. 2, the image data compressor 221 divides each pixel included in the pixel array (hereafter, called "pixel array before compression" in FIG. 3) of the mapped image data 12 into n pixels (step S11). That is, a pixel array of (m*n) pixels is generated (wherein * denotes the multiplication sign). Each pixel value in the pixel array before division 12 is set to n corresponding pixels in the pixel array after division 12a.

The processing at this time will be explained while referencing to FIG. 3. In FIG. 3, it is assumed that the pixel values in the pixel array before compression 12 are equal to 10, 20, 30, 40, and 50. In the following explanation, the pixel with its value being equal to 10, for example, is called a pixel of 10 as a shortened form. Through the processing in step S21, a pixel of 10 is converted to three pixels of 10; a pixel of 20, three pixels of 20; a pixel of 30, three pixels of 30; a pixel of 40, three pixels of 40; and a pixel of 50, three pixels of 50.

Afterwards, the image data compressor 221 divides the pixel array 12a into n groups (step S12). This division is performed by taking a unit of m pixels after another beginning at the left side of the pixel array 12a and then grouping them in a unit of m pixels.

According to the example as shown in FIG. 3, fifteen pixels comprising the pixel array 12a are divided into differing groups: A first group of 10, 10, 20, and 20; A second group of 20, 30, 30, 30, and 40; A third group of 40, 40, 50, 50, and 50.

Lastly, the mean of the pixel values in each of the n groups is calculated thus obtaining n mean pixel values and generating the pixel array after compression 13 made up of the n mean pixel values (step S13).

According to the example as shown in FIG. 3, the mean of 14 is calculated from the first group through equation 21; the mean of 30, from the second group through equation 30; and the mean of 46, from the third group through equation 23. The means are then lined up in the written order, thus generating the pixel array after compression 13 made up of the pixels of 14, 30, and 46.

In summary, the compression algorithm of this embodiment is made up of the processes: (1) First process that multiplies the value of each of the neighboring pixels in the pixel array before compression 12 by a given coefficient (which is decided so that the sum of the coefficients that are multiplied by the neighboring pixel values, respectively can be equal to m/n); (2) Second process that sums the resultant values of the neighboring pixels obtained by the multiplication; and (3) Last process that multiplies the resultant sum by the value of n/m.

On the other hand, the image data compressor 221 generates the pixel array for reconstruction 14 from the pixel array before compression 12 (step S14). Specifically, some are picked out from m pixels, which comprise the pixel array before compression 12, at the ratio of one to (m/(m−n)) pixels, and are then used to be the respective pixel values in the pixel array for reconstruction 14. As a result, the pixel array for reconstruction 14 includes (m−n) pixels.

In the example as shown in FIG. 3, since 5/(5−3)=2.5, some pixels are picked out from the pixel array before compression 12 at the ratio of one to 2.5 pixels (or at the ratio of two to five if decimals are omitted).

Here, it is decided which pixels in the pixel array before compression 12 should be picked out, by the following function with its argument being equal to the index value: Aindex of the pixel array for reconstruction 14.

$m*A\text{index}/(m-n)$ (decimals are omitted)

where: "index", which is used in the following explanation, indicates the order of each pixel obtained by counting pixels comprising a pixel array; and the first pixel is tagged by the index of 0.

In the example as shown in FIG. 3, for the pixel of 10 in the pixel array for reconstruction 14 tagged by the index of 0, m*Aindex/(m−n)=5*0/(5−3)=0. This fact recommends that a pixel of 10 in the pixel array before compression 12 tagged by the index of 0 be picked out. For the pixel of 30 in the pixel array for reconstruction 14 tagged by the index of 1, m*Aindex/(m−n)=5*1/(5−3)=2.5 (or 2 if decimals are omitted). This fact recommends that a pixel of 30 in the pixel array before compression 12 tagged by the index of 2 be picked out. For the pixel in the pixel array for reconstruction 14 tagged by the index of 2, m*Aindex/(m−n)=5*2/(5−3)=5. The fact that there is no pixel in the pixel array before compression 12 tagged by the index of 5, shows that there is no pixel to be picked out.

Figure 4:
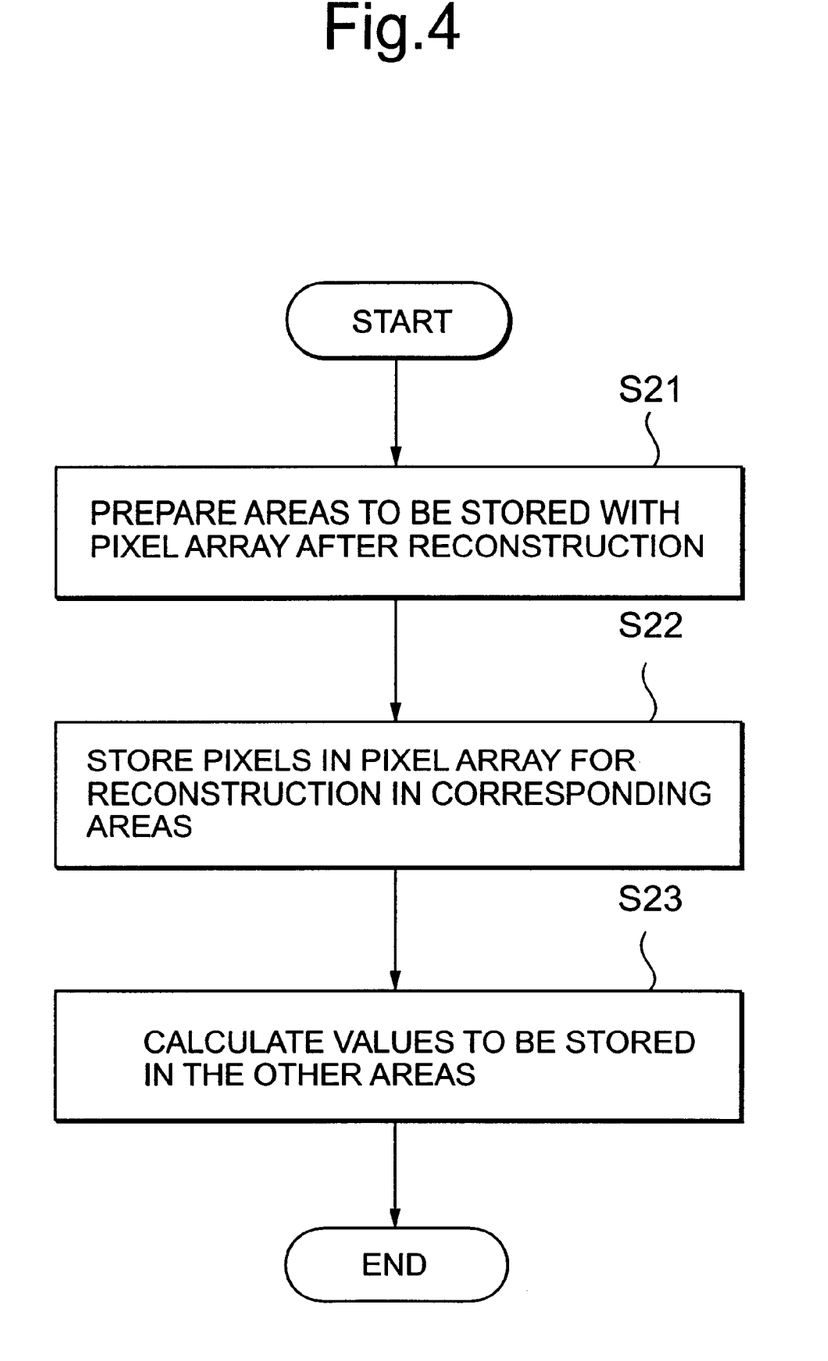
FIG. 4 is a flowchart showing an image data reconstruction algorithm, according to the first embodiment of the present invention.
Figure 5:
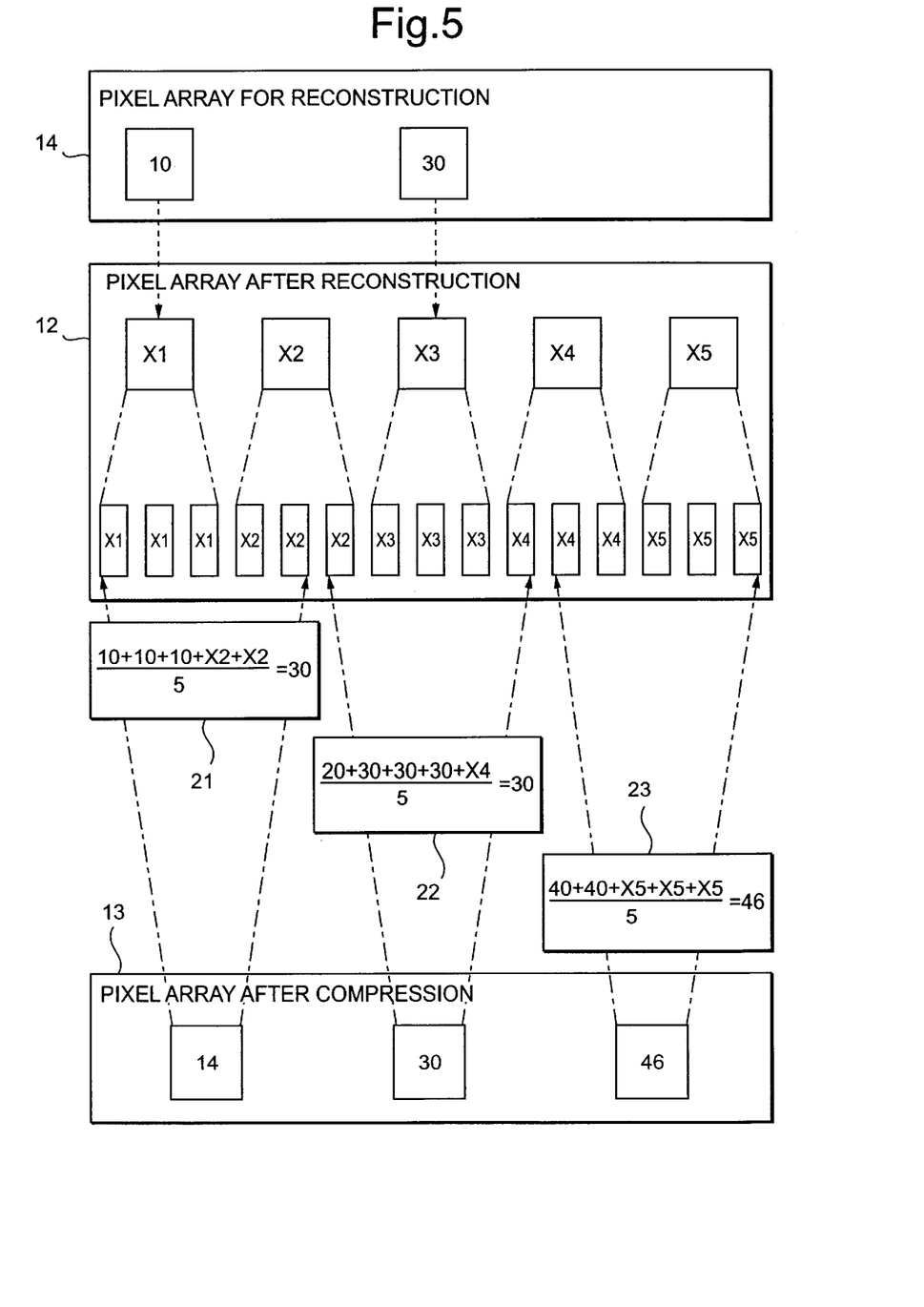
FIG. 5 is a figure explaining an image data reconstruction algorithm, according to the first embodiment of the present invention.

FIG. 4 is a flowchart showing an example of a reconstruction algorithm used for the image data reconstructor 311. This embodiment relates to a method of reconstructing image data compressed by the process shown in the flowchart of FIG. 2. In more detail, it relates to a method of reconstructing the pixel array before compression 12 (hereafter, called "pixel array after reconstruction" in the explanation of FIG. 4) of m pixels from the pixel array after compression 13 of n pixels and the pixel array for reconstruction 14 of (m−n) pixels. FIG. 5 is also a drawing explaining a detailed process according to this method. Note that FIG. 5 shows an example where m=5 and n=3 in the same condition as in FIG. 3.

In FIG. 4, the image data reconstructor 311 is comprised of m storage areas, which are stored with m pixel values comprising the pixel array after reconstruction 12, and m*n storage areas, which are stored with m*n pixel values resulting from the division of m pixels into n pieces. (Step S21)

In the example of FIG. 5, five storage areas are prepared for storing five pixel values which comprise the pixel array after reconstruction 12, and the stored pixel values are marked by X1, X2, X3, X4, and X5, respectively.

Next, the image data reconstructor 311 stores the pixel values, which are in the pixel array for reconstruction 14, in the above areas in place (Step S22). The indexes of the areas can be calculated from the following equation with an index value: Aindex for the pixel array for reconstruction 14 as an argument.

$m*A\text{index}/(m-n)$ (decimals are omitted)

In the example of FIG. 5, for the pixel of 10 of the pixels comprising the pixel array for reconstruction 14, since Aindex=0, m*Aindex/(m−n)=5*0/(5−3)=0. Accordingly, the $0^{th}$ storage area in the pixel array after reconstruction 12 (which is marked by X1) is stored with 10. For the pixel of 30, since Aindex=1, m*Aindex/(m−n)=5*1/(5−3)=2.5 (or 2 when decimals are omitted). Accordingly, the $2^{th}$ storage area in the pixel array after reconstruction 12 (which is marked by X3) is stored with 30.

The image data reconstructor 311 also calculates a value to be stored in a vacant storage area within the area prepared for the pixel array for reconstruction 12 (step S23). At this time, an area in the pixel array after reconstruction 12 where a computable value can be stored may be decided by calculating the following equation with an index: Bindex for the pixel array after compression 13 as an argument.

$(m*(B\text{index}+1)+1)-1)/n$ (decimals are omitted)

In the example of FIG. 5, for the pixel of 14 of the pixels comprising the pixel array after compression 13, Bindex=0. Accordingly, (m*(Bindex+1)−1)/n=(5*(0+1)−1)/3=1.333 (or 1 if decimals are omitted). This fact indicates that a value, which is going to be stored in the area tagged by the index of 1, or X2 is computable. For the pixel of 30, Bindex=1. Accordingly, (m*(Bindex+1)−1)/n=(5*(1+1)−1)/3=3. This fact indicates that a value, which is going to be stored in the area tagged by the index of 3, or X4 is computable. For the pixel of 46, Bindex=2. Accordingly, (m*(Bindex+1)−1)/n=(5*(2+1)−1)/3=4.666 (or 4 if decimals are omitted). This fact indicates that a value, which is going to be stored in the area tagged by the index of 4, or X5 is computable.

In this embodiment, the pixel values in the pixel array for reconstruction 14 are set, at first, to function as pixel values comprising the pixel array after reconstruction 12. Accordingly, each of equations 21, 22, and 23 corresponding to each pixel in the pixel array after compression 13, include only one unknown pixel value. That is, since, in the example of FIG. 5, the pixel value X1 is obtained directly from the pixel array for reconstruction 14, the first obtained, unknown pixel value from the first pixel value in the pixel array after compression 13 is X2. Specifically, according to equation 21, X2=(5*14−10−10−10)/2=20. At this time, the coefficient (the denominator of the equation) of the unknown pixel value can be calculated from the following equation with the argument of an index: Bindex for a corresponding pixel in the pixel array after compression 13.

(Bindex*m) % n (where % denotes an operator indicating a remainder)

More specifically, the coefficient of 2 of X2 is calculated through (Bindex*m) %n=2.

Since the fact that X2 is equal to 20 has been known in advance and the fact that X3 is equal to 30 can be determined directly from the pixel array for reconstruction 14, equation 22 provides (20+30+30+30+X4)/5=30. Accordingly, an unknown pixel value is only the pixel value: X4. Consequently, X4=30*5−20−30−30−30=4 is obtained. Even in this case, the coefficient of 1 of X4 can be calculated through (Bindex*m) %n=(2*5) %3=1.

Since the fact that X4 is equal to 40 has been known in advance through equation 22, equation 23 provides with (40+40+X5+X5+X5)/5=46. Accordingly, an unknown pixel value is only the pixel value: X5. Consequently, X5=(46*5−40−40)/3=50 is obtained. Even in this case, the coefficient of 3 of X5 can be calculated through (Bindex*m) %n=(3*5) %3=0. In the case of the remainder being equal to zero, the value of n is provided instead.

As described above, according to this embodiment, the pixel array before compression 12 made up of m pixels can be compressed into the pixel array after compression 13 made up of n pixels. Afterwards, the pixel array after compression 13 and the pixel array for reconstruction 14, which has been generated at the time of the compressing process and made up of (m−n) pixels, allows its reconstruction into the pixel array after reconstruction 12 made up of m pixels.

Besides, since the number n of the pixels of compressed image data can be optionally decided based upon the number m of the pixels of image data before compression, the ratio of the amount of compressed image data to that of reconstructed pixel data can be freely selected.

Next, examples of a compression algorithm used in the image data compressor 221 and a reconstruction algorithm used in the image data reconstructor 311 will be described.

Figure 6:
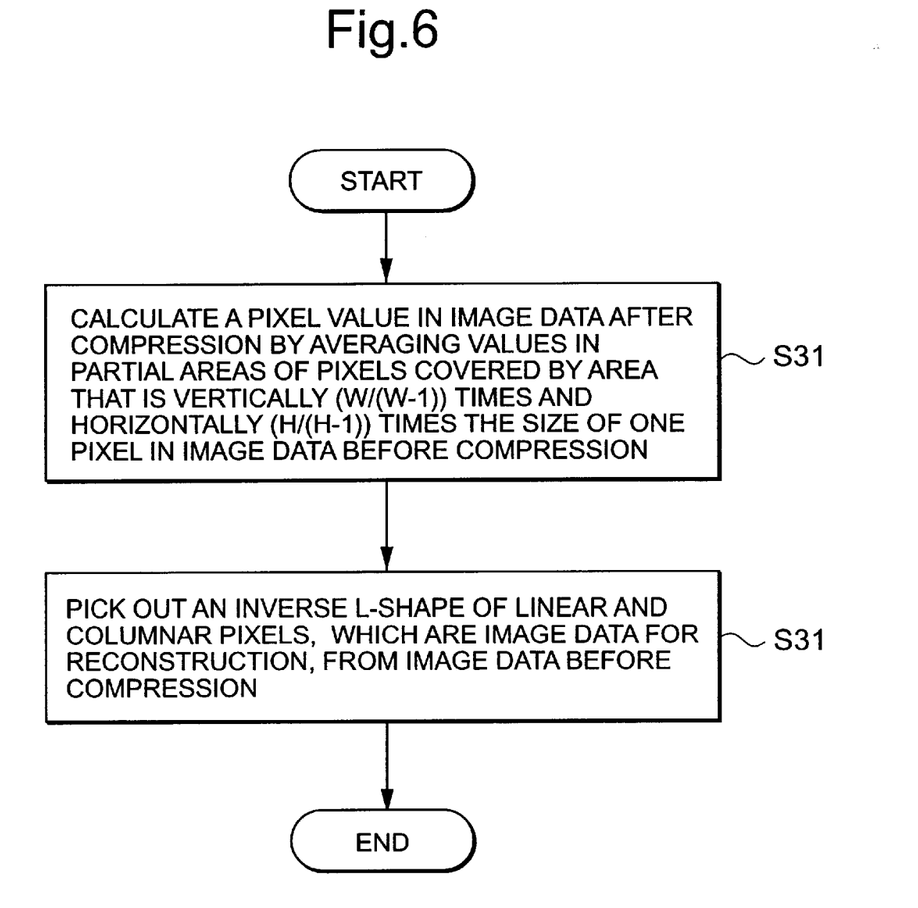
FIG. 6 is a flowchart showing an example of an image data compression algorithm, according to the first embodiment of the present invention.

FIG. 6 is a flowchart showing the process flow of the image data compressor 221 of the embodiment. This embodiment relates to a method of compressing W linear pixels and H columnar pixels of image data into (W−1) linear pixels and (H−1) columnar pixels of image data.

Figure 7:
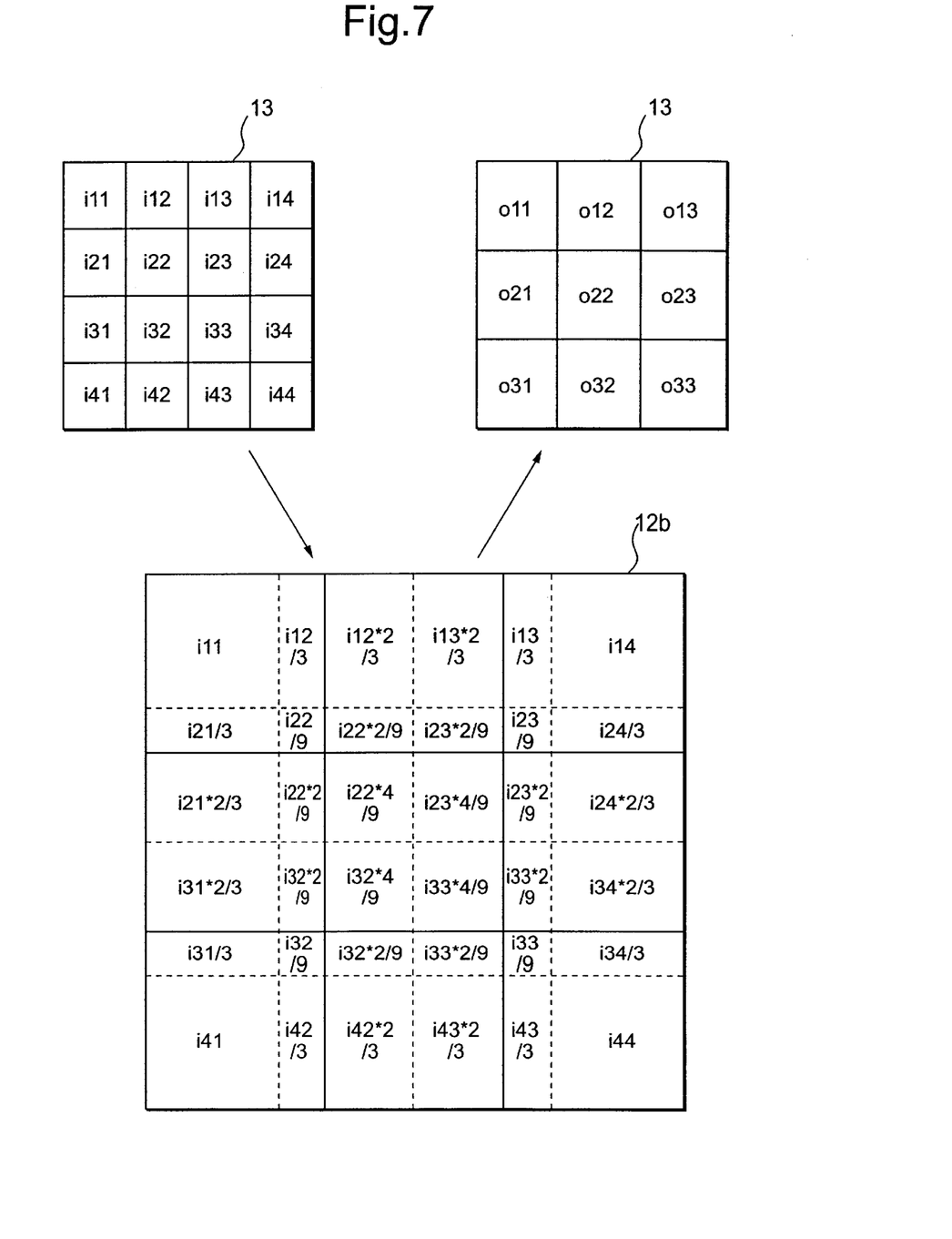
FIG. 7 is a figure explaining an image data compression algorithm, according to the first embodiment of the present invention.

FIG. 7 illustrates the case that: W=H=4; and 16 (4*4) pixels of image data 12 are compressed into 9 (3*3) pixels of image data 13.

First, the image data compressor 221 averages the values in partial areas of the pixels covered by the area that is vertically (W/(W−1)) times and horizontally (H/(H−1)) times the size of one pixel in the image data before compression 12 in conformity with the ratio of pixel areas, into a resulting average pixel value or the value of corresponding pixels in the image data after compression 13 (step S31).

In the example of FIG. 7, when compressing the image data 12 into the image data 13, as shown in 12b, each pixel in the image data 12 corresponds to each pixel in the image data 13 (note that, in the image data 12b, each pixel corresponding to that in the image data before compression 12 is partitioned by a broken line, whereas a pixel corresponding to that in the image data after compression 13 is enclosed by a bold line). The pixel values: o11, o12, ..., and o33 in the image data before compression 13 can be calculated based upon the ratios of pixel areas through the following equations:

$$o11=(i11+i12/3+i21/3+i22/9)*(9/16) \quad \text{(Equation 1)}$$

$$o12=(2*i12/3+2*i13/3+2*i22/9+2*i23/9)*(9/16) \quad \text{(Equation 2)}$$

$$o13=(i13/3+i14+i23/9+i24/3)*(9/16) \quad \text{(Equation 3)}$$

$$o21=(2*i21/3+2*i31/3+2*i22/9+2*i32/9)*(9/16) \quad \text{(Equation 4)}$$

$$o22=(4*i22/9+4*i23/9+4*i32/9+4*i33/9)*(9/16) \quad \text{(Equation 5)}$$

$$o23=(2*i23/9+2*i24/3+2*i33/9+2*i34/3)*(9/16) \quad \text{(Equation 6)}$$

$$o31=(i31/3+i32/9+i41+i42/3)*(9/16) \quad \text{(Equation 7)}$$

$$o32=(2*i32/9+2*i42/3+2*i33/9+2*i43/3)*(9/16) \quad \text{(Equation 8)}$$

$$o33=(i33/9+i43/3+i34/3+i44)*(9/16) \quad \text{(Equation 9)}$$

where i11, i12, ..., and i44 denote respective pixel values in the image data before compression 12.

In this embodiment, since image data is compressed by decreasing areas corresponding to a row and a column of the image data, each pixel in the image data after compression can be decisively calculated through a linear combination equation of four neighboring pixel values in the original image data, in the manner as described above.

In a similar manner to the compression algorithm as described in the previous embodiment, the compression algorithm in this embodiment is comprised of the following processes: (1) A first process of multiplying neighboring pixels in the pixel array before compression 12 by respective given coefficients (where these coefficients are selected so that the sum of these can be equal to a value resulting from the division of m by n); (2) A second process of summing up the resultant values for the neighboring pixels; and (3) A third process of multiplying the resultant summed value by the value resulting from division of n by m.

Next, the image data compressor 221 picks out a line and a column of pixels in the image data before compression 12, which are used as pixel data for reconstruction 14 (step S32).

Figure 9:
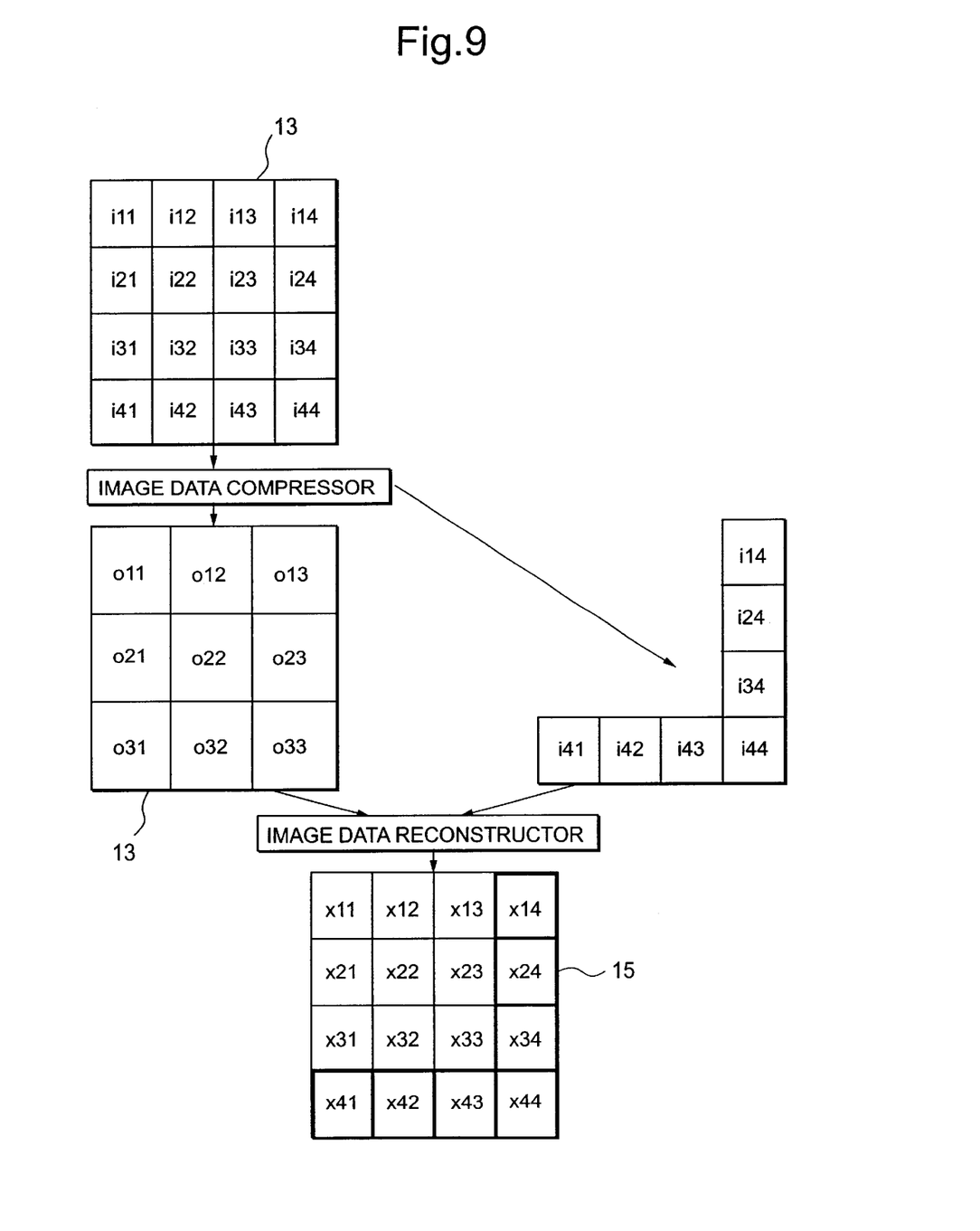
FIG. 9 is a figure explaining an image data reconstruction algorithm, according to the first embodiment of the present invention.

In the example of FIG. 9, the rightmost columnar pixels and the lowest linear pixels, which are in an inverse L-shape, are selected so as to be pixel data for reconstruction 14. Note that: the rightmost columnar and the lowermost linear pixels, which are in an inverse L-shape, are selected here; alternatively, the leftmost columnar and the uppermost linear pixels, which are in an upside-down-turned L-shape, can be also selected; yet alternatively, a cross-shape of linear and columnar pixels can also be selected.

Figure 8:
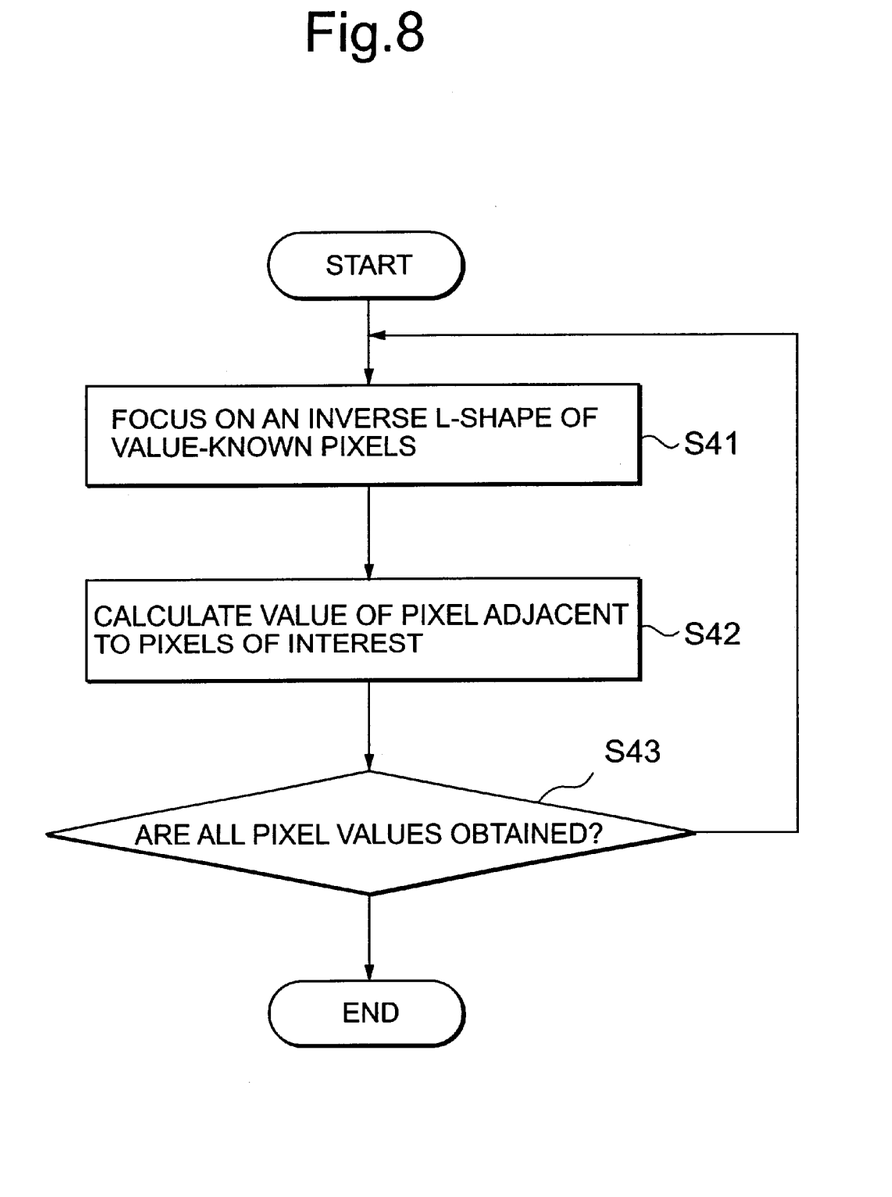
FIG. 8 is a flowchart showing an image data reconstruction algorithm, according to the first embodiment of the present invention.

FIG. 8 is a flowchart showing a process flow of the image data reconstructor 311 of this embodiment.

First, the image data reconstructor 311 focuses on the inverse L-shape of three pixels with their values being known (step S41). At the beginning of this process, since what has been known are the pixels in the inverse L-shape selected in the step S32 as shown in FIG. 6, the inverse L-shape of three pixels in the inverse L-shape or the right undermost corner of three points are focused.

Since image data is compressed by calculating each pixel value in the compressed image data 13 through a linear combination equation of four neighboring pixel values in the image data before compression 12, the value of the pixel adjacent to all the inverse L-shape of three pixels of interest is clearly computable. Therefore, the value of this pixel is then calculated (step S42).

In the example of FIG. 9, since the right undermost corner of three pixel values in the pixel data for reconstruction 14 are equal to i34, i43, and i44, the pixel value: X33 corresponding to the pixel adjacent to all these three pixels in the reconstructed pixel data 15 can be calculated. Specifically, X33 can be calculated by substituting known values for i34, i43, i44, and o33 in equation 9 and solving it with i33 being an unknown value.

Lastly, the image data reconstructor 311 determines whether all the pixel values have been obtained (step S43). If it is determined that all the values are obtained, this process is terminated. Otherwise, if it is determined that they are not obtained yet, the process in step S41 is again executed.

In the example of FIG. 9, since there is at least an unknown pixel value at the time, the process in step 41 is executed again.

The image data reconstructor 311 again focuses on the inverse L-shape of three pixels with their values been known (step S41). Note that the pixels of interest that were focused so far are excluded here.

In the example of FIG. 9, since X33 has been obtained through the previously executed processes, an inverse L-shape of three value-known pixels: X33, X42, and X43 can be then focused. The pixel value X32 corresponding to the pixel adjacent to all these three pixels in the after-reconstructed image data 15 can be calculated (step S42). Specifically, X32 can be calculated by substituting known values for i42, i33, i43, and o32 in equation 8, and solving it with X32 being the unknown value.

In the example of FIG. 9, since there is at least an unknown pixel value, the process in step S41 is again executed (step S43).

The image data reconstructor 311 focuses on an inverse L-shape of three pixels with their values being known (step S41), again.

In the example of FIG. 9, X33 has been obtained through the previously executed process, and X24 and X34 have also been calculated from the pixel data for reconstruction 14. Therefore, the inverse L-shape of three value-known pixels: X24, X33, and X34 can be focused. The pixel value: X23 corresponding to the pixel adjacent to all three pixels in the reconstruction image data 15 can then be calculated (step S42). Specifically, X23 can be calculated by substituting known values for i24, i33, i34, and o23 in equation 6 and solving it with i23 being the unknown value X23.

Afterwards, a vertically and horizontally adjacent pixel after another can be obtained through the aforementioned calculation. Specifically, the inverse L-shape of value-known pixels: X32, X41, and X42 allow X31 to be calculated. Also, the inverse L-shape of value-known pixels: X14, X23, and X24 allow X13 to be calculated. In the same manner, X22, X21, X12, and X11 can be calculated one after another.

Applying the above processes repeatedly or applying the above processes to several divided blocks of pixels allows a compression and reconstruction of an image in a desired compression ratio.

Next, a second embodiment of the present invention will be described.

Figure 10:
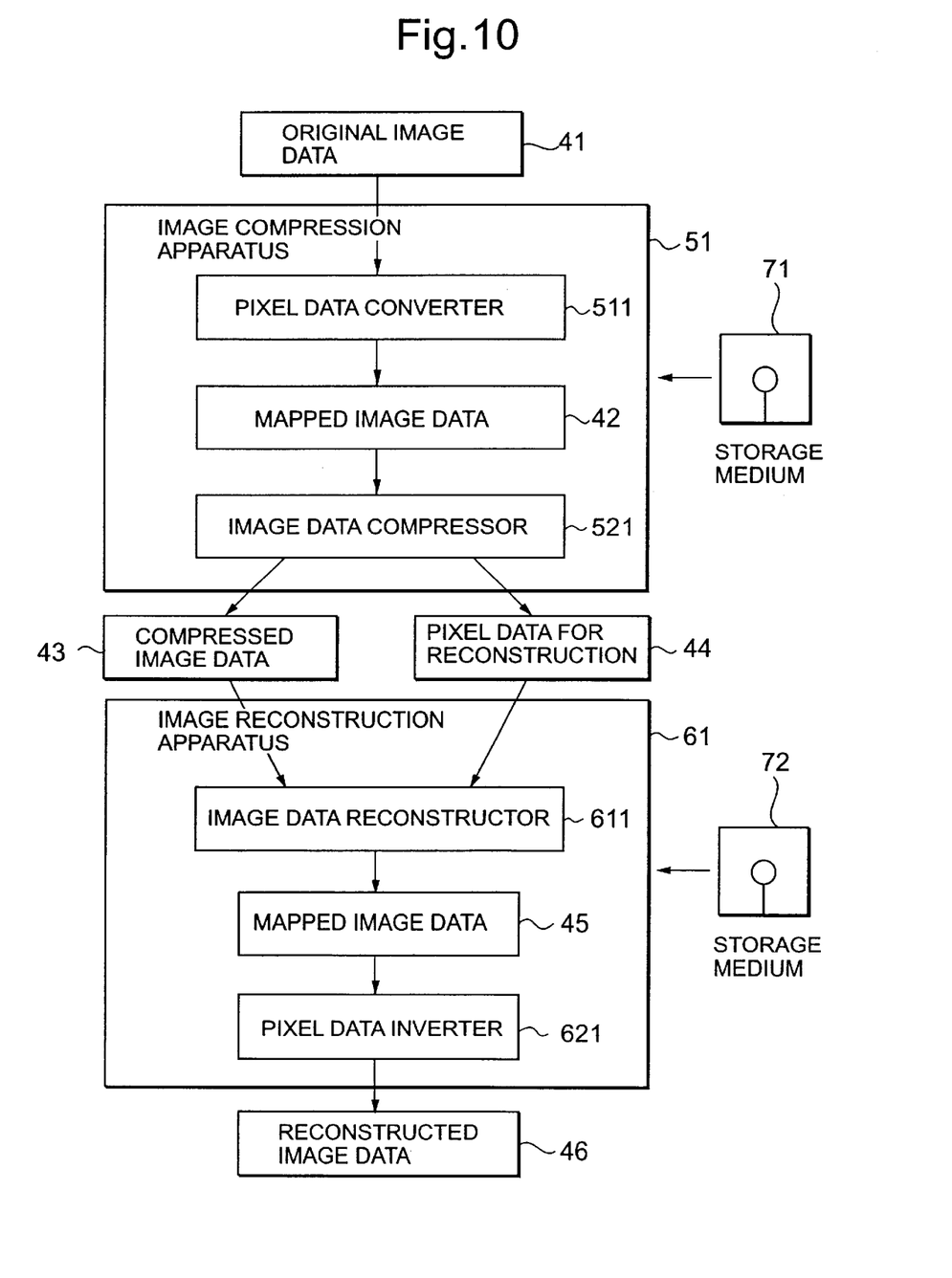
FIG. 10 is a block diagram showing the configuration of a second embodiment of the present invention.

In FIG. 10, the second embodiment of the present invention is comprised of the following elements: Image compression apparatus 51, which generates compressed image data 43 and reconstructed pixel data 44 from the original image data 41; Image reconstruction apparatus 61, which subjects the compressed image data 43 to a reconstruction process with the assistance of the reconstructed pixel data 44 into a resulting reconstructed image data 46; Storage medium 71, which is stored with computer programs (hereafter, called image data compression program) that allows the image data compression process to be executed by the image compression apparatus 51; and storage medium 72, which is stored with computer programs (hereafter, called image data reconstruction program) that allows the image data reconstruction process to be executed by the image reconstruction apparatus 61. The storage media 71 and 72 can be a magnetic disk, a semiconductor memory unit, or other storage media. Furthermore, the image data compression program stored in the storage medium 71 and the data reconstruction program stored in the storage medium 72 can each be divided and stored in several storage media.

The image data compression program stored in the storage medium 71 is uploaded to the image compression apparatus 51. The image compression apparatus 51 conducts in conformity with the procedure written in the uploaded program, in the same manner as the image compression apparatus 21 of the first embodiment. On the other hand, the data reconstruction program stored in the storage medium 72 is uploaded to the image reconstruction apparatus 61. The image reconstruction apparatus 61 conducts in conformity with the procedure written in the uploaded program, in the same manner as the image reconstruction apparatus 31 of the first embodiment.

Alternatively, the image data compression program and the data reconstruction program can be uploaded in the form of an electrical signal via a signal line other than the storage media 71 and 72.

According to the first and the second embodiment of the present invention, since each pixel value in the compressed image data is obtained by averaging the values of neighboring pixels, a high quality of an image without its partial pixels being removed or intensified can be provided even after the image has been compressed.

Furthermore, subjecting image data to a multi-level compression process and then transmitting the resulting compressed image data and reconstructed pixel data after another allows the receiver side to display an image at the time after the image data has been received, and then to improve the resolution of the image as the reconstructed pixel data arrives. There are conventional techniques that improve the resolution of an image as image data is received. However, there are the following problems with them: Total amount of communication data increases; an amount of data for each resolution of an image cannot be designated. According to the present invention, the total amount of compressed image data and reconstructed pixel data is equal to that of the original image data, and the resolution can be improved step by step without an increase in the total communication amount. Furthermore, since the ratio of the amount of the compressed image data to that of the reconstructed pixel data can be optionally selected, the data amount for each resolution level can be designated. This allows a division into an optimal amount of data dependent upon the servicing bands in a communication line, the displaying (or receiving) capability of the receiver side, etc.

An image data compression and reconstruction apparatus and method, and a storage medium thereof, according to the present invention, have been described in connection with several preferred embodiments. It is to be understood that the subject matter encompassed by the present invention is not limited to that specified embodiment. On the contrary, it is intended to include as many alternatives, modifications, and equivalents as can be included within the spirit and scope of the following claims.

What is claimed is:

1. An image apparatus, which compresses first image data made up of a pixel array of m pixels into second image data made up of a pixel array of n (n<m) pixels, comprising:

an image data compressor that: duplicates each pixel included in the pixel array of m pixels structuring said first image data n times and generates a pixel array of (m*n) pixels; takes out n units of m pixels in order from the beginning of the pixel array of (m*n) pixels; calculates the mean of the pixel values in each of said n units; and generates said second image data including the pixel array of said n units.

2. The image apparatus as claimed in claim 1, wherein said image data compressor selects pixels at a ratio of one to (m/(m−n)) from the pixel array of m pixels of said first image data and generates a pixel array for reconstruction.

3. The image apparatus as claimed in claim 2, further comprising an image data converter, which converts input image data in such a manner that similar values of pixels can have similar colors, thus generating said first image data, wherein said input image data has a nature that certain close-to-each-other values of respective pixels does not always mean that their colors are similar to each other.

4. The image apparatus as claimed in claim 1, 2 or 3, further comprising:

an image data reconstructor that calculates pixel values of pixels in said second image data and pixels in said pixel array for reconstruction, and reconstructs said first image data.

5. The image apparatus as claimed in claim 4, further comprising an image data converter, which converts said first image data in such a manner that similar values of pixels do not always have similar colors, thus generating said first image data, wherein said image data has a nature that certain close-to-each-other values of respective pixels do not always mean that their colors are similar to each other.

6. An image method, which compresses first image data made up of a pixel array of m pixels into second image data made up of a pixel array of n (n<m) pixels, comprising:

duplicating each pixel included in the pixel array of m pixels structuring said first image data n times to generate a pixel array of (m*n) pixels;

taking out n units of m pixels each in order from the beginning of the pixel array of (m*n) pixels;

calculating the mean of the pixel values in each of said n units; and generating said second image data including the pixel array of said n units.

7. The image method as claimed in claim 6, further comprising selecting pixels at a ratio of one to (m/(m−n)) from the pixel array of m pixels of said first image data to generate a pixel array for reconstruction.

8. The image method as claimed in claim 7, further comprising generating said first image data by converting input image data in such a manner that similar values of pixels can have similar colors, wherein said input image data has a nature that certain close-to-each-other values of respective pixels do not always mean that their colors are similar to each other.

9. The image method as claimed in claim 6, 7 or 8, further comprising calculating pixel values of pixels in said second image data and pixels in said pixel array for reconstruction, and reconstructing said first image data.

10. The image method as claimed in claim 9, further comprising generating to-be-reconstructed image data by converting said first image data in such a manner that similar values of pixels do not always have similar colors, wherein said to-be-reconstructed image data has a nature that certain close-to-each-other values of respective pixels do not always mean that their colors are similar to each other.

11. A storage medium, which is stored with a computer program for compressing first image data made up of a pixel array of m pixels into second image data made up of a pixel array of n (n<m) pixels; the said computer program enabling a computer to execute the steps of:

duplicating each pixel included in the pixel array of m pixels structuring said first image data n times to generate a pixel array of (m*n) pixels;

taking out n units of m pixels each in order from the beginning of the pixel array of (m*n) pixels;

calculating the mean of the pixel values in each of said n units; and generating said second image data including the pixel array of said n units.

12. The storage medium as claimed in claim 11, wherein the said computer program enables a computer to execute a step of selecting pixels at a ratio of one to (m/(m−n)) from the pixel array of m pixels of said first image data to generate a pixel array for reconstruction.

13. The storage medium as claimed in claim 12, wherein the said computer program enables a computer to execute a step of generating said first image data by converting input image data in such a manner that similar values of pixels can have similar colors, wherein said input image data has a nature that certain close-to-each-other values of respective pixels dose not always mean that their colors are similar to each other.

14. The storage medium as claimed in claim 11, 12 or 13, wherein said computer program enables a computer to execute a step of calculating pixel values of pixels in said second image data and pixels in said pixel array for reconstruction, and reconstructing said first image data.

15. The storage medium, as claimed in claim 14, wherein said computer program enables a computer to execute a step of generating to-be-reconstructed image data by converting said first image data in such a manner that similar values of pixels do not always have similar colors, wherein said to-be-reconstructed image data has a nature that certain close-to-each-other values of respective pixels do not always mean that their colors are similar to each other.

16. A group of storage media, being respectively stored with a plurality of partial computer programs, which are provided by dividing said computer program as described in claim 11 into said plurality of partial computer programs.

17. A group of storage media, being respectively stored with a plurality of partial computer programs, which are provided by dividing said computer program as described in claim 14 into said plurality of partial computer programs.

18. A computer program, which is used to compress first image data made up of a pixel array of m pixels, which is embodied in electric signals, into second image data made up of a pixel array of n (n<m) pixels; said computer program enabling a computer to execute the steps of:

duplicating each pixel included in the pixel array of m pixels structuring said first image data n times to generate a pixel array of (m*n) pixels;

taking out n units of m pixels each in order from the beginning of the pixel array of (m*n) pixels;

calculating the mean of the pixel values in each of said n units; and generating said second image data including the pixel array of said n units.

19. The computer program of claim 18, wherein said computer program enables a computer to execute a step of calculating pixel values of pixels in said second image data and pixels in said pixel array for reconstruction, and reconstructing said first image data.

* * * * *

UNITED STATES PATENT AND TRADEMARK OFFICE
CERTIFICATE OF CORRECTION

PATENT NO. : 6,823,085 B1
DATED : November 23, 2004
INVENTOR(S) : Arino

It is certified that error appears in the above-identified patent and that said Letters Patent is hereby corrected as shown below:

Delete Drawing Sheet 5 and substitute therefor the Drawing Sheet consisting of fig 5 as shown on the attached page.

Signed and Sealed this

Fifth Day of July, 2005

JON W. DUDAS
*Director of the United States Patent and Trademark Office*

Fig.5